United States Patent
Wiehn et al.

(10) Patent No.: US 11,613,703 B2
(45) Date of Patent: Mar. 28, 2023

(54) FIRE RETARDING COMPOSITION FOR USE IN WOOD COMPOSITE PANELS

(71) Applicant: ECOCHEM INTERNATIONAL NV, Olen (BE)

(72) Inventors: Helmut Wiehn, Heuchelheim-Klingen (DE); Barbora Deppe, Offenburg (DE); Herman Meynaerts, Rillaar (BE); Pieter Daeseleire, Reet (BE)

(73) Assignee: ECOCHEM INTERNATIONAL NV, Olen (BE)

( * ) Notice: Subject to any disclaimer, the term of this patent is extended or adjusted under 35 U.S.C. 154(b) by 13 days.

(21) Appl. No.: 16/473,686

(22) PCT Filed: Jan. 2, 2018

(86) PCT No.: PCT/EP2018/050056
§ 371 (c)(1),
(2) Date: Jun. 26, 2019

(87) PCT Pub. No.: WO2018/122406
PCT Pub. Date: Jul. 5, 2018

(65) Prior Publication Data
US 2019/0330531 A1     Oct. 31, 2019

(30) Foreign Application Priority Data

Dec. 30, 2016   (BE) .................................. 2016/5996
Mar. 17, 2017   (BE) .................................. 2017/5166

(51) Int. Cl.
*C09K 21/04*     (2006.01)
*D21J 1/08*      (2006.01)

(52) U.S. Cl.
CPC ................ *C09K 21/04* (2013.01); *D21J 1/08* (2013.01)

(58) Field of Classification Search
None
See application file for complete search history.

(56) References Cited

U.S. PATENT DOCUMENTS

| | | | | |
|---|---|---|---|---|
| 3,475,199 A * | 10/1969 | Murray | ................ | C10G 73/00 |
| | | | | 428/486 |
| 4,725,382 A | 2/1988 | Lewchalermwong | | |
| 5,948,323 A | 9/1999 | McLaughlin et al. | | |
| 6,368,529 B1 * | 4/2002 | Lloyd | ..................... | B27N 1/00 |
| | | | | 264/109 |
| 6,982,049 B1 * | 1/2006 | Mabey | .................. | C09K 21/04 |
| | | | | 106/18.16 |
| 8,642,184 B2 * | 2/2014 | Wiehn | .................. | C09K 21/00 |
| | | | | 428/536 |
| 8,715,540 B2 | 5/2014 | Curzon et al. | | |
| 2014/0102615 A1 * | 4/2014 | Griem | ................... | C09K 21/04 |
| | | | | 156/62.2 |
| 2015/0299578 A1 * | 10/2015 | Simon | ................... | C09K 21/14 |
| | | | | 252/606 |

FOREIGN PATENT DOCUMENTS

| | | |
|---|---|---|
| EP | 2586849 A2 | 5/2013 |
| WO | 02102926 A1 | 12/2002 |
| WO | 2007096883 A2 | 8/2007 |

* cited by examiner

*Primary Examiner* — Dennis R Cordray
(74) *Attorney, Agent, or Firm* — Hodgson Russ LLP

(57) ABSTRACT

The current invention concerns a fire retardant composition for use in wood composite panels, either comprising a fire retardant agent or an intumescent formulation, whereby the pH of a 10% aqueous solution of said composition lies between 3.5 and 8.5. The present invention also provides for a specific use of the composition in fire retardant wood composite panels, the respective method for producing those panels, as well as the resulting wood composite panels themselves.

19 Claims, No Drawings

FIRE RETARDING COMPOSITION FOR USE IN WOOD COMPOSITE PANELS

TECHNICAL FIELD

The invention pertains to the technical field of fire retardant compositions for use in wood composite panels.

BACKGROUND

Wood composite panels are widely used in the construction business. Both wood as well as these wood-base materials have to meet extensive requirements with regard to flameproof properties. In Europe, various standards and requirements are introduced which allow comparison of fire properties of construction materials (e.g. Euroclasse EN 13501-1). Characteristics such as hardly inflammability, ignitability, flame spread, calorific value as well as the development of smoke and burning droplets of the material are all taken into account when classifying a construction material in these classes.

In order to meet these requirements and to meet the highest quality standards, wood composite panels are during their production often supplemented with compositions with fire retarding characteristics and optionally smoke suppressors.

U.S. Pat. No. 8,715,540 for instance describes a fire retardant composition for reducing the amount of burning that occurs to a material as well as the smoke density which is produced. The composition may be added to construction material.

EP 2 586 849 is directed to an aqueous composition comprising monoammonium dihydrogen phosphate as flame retardant. The composition is used during the production of wood composite panels to create flame retarding wood composite panels.

WO 02/102926 describes a fire retardant composition consisting essentially of tributylamine, borax and monoammonium phosphate, which in aqueous solution has a resulting pH of 6.0 to 8.5 and which is used in the production of fiberboards by spraying.

U.S. Pat. No. 4,725,382 concerns a water soluble fire retardant composition that utilizes pH control to afford a fire retardant material of low corrosiveness and comprises boric acid, monoammonium phosphate and diammonium phosphate. pH of an aqueous solution is about 6.7 to 6.95.

The production of these wood composite panels typically makes use of an adhesive or resin to provide cohesion to the wood particles or fibers. Addition of additives such as fire retardant compositions can have an impact on the functionality of these resins (e.g. lower bond strength). As a consequence, higher amounts of resins are sometimes needed in order to ensure good cohesion of the articles and thus good quality end products.

There is thus a need in the art for an improved manner of producing fire retardant and smoke suppressing wood composite panels, as well as a need for better performing fire retardant/smoke suppressing compositions without influencing the functionality of resins. The current invention aims to provide a solution for the latter by fine-tuning the fire retardant composition in function of the chosen resin.

SUMMARY OF THE INVENTION

In a first aspect, the present invention provides for a fire retardant composition according to claim 1. This composition is particularly useful for use in wood composite panels. The pH of the composition has been meticulously adapted by the addition of one or more pH regulators, in order to provide a good compatibility with the resins used during the production of the wood composite materials. Moreover, the pH may be further controlled, based on the specific resin used during the production. By controlling the pH of the fire retardant composition to a very specific and predetermined range, the inventors of the current invention found that the bond strength of the resin was positively influenced. This even resulted in a lower resin consumption which on its turn has a positive influence on cost.

In a second aspect, the present invention provides for a fire retardant composition according to claim 2. This composition is particularly useful for use in wood composite panels and comprises an intumescent formulation. While intumescents are known to be used as fire retardant, their use in wood composite panels has to date been limited to coatings of the finished panels, because of their incapability with the resins used for the production of the panels. These panels are typically produced of cellulose containing material such as wood chips, which are bound together by a resin and pressed. Previously, when adding the intumescent formulation to the cellulose containing material and resin, the formulation and resin were found to react. This led to an early activation of the intumescent formulation as well as degradation of the resin. The inventors of the current invention now found that by adapting the pH of the composition by the addition of one or more pH regulators, the intumescent formulation could also be applied in the core of a wood composite panel. By controlling the pH of the fire retardant composition to a very specific and predetermined range, the inventors of the current invention found that the unwanted activation of the intumescent formulation and degradation of the resin was prevented. The intumescent formulation and resin remained stable during the production of said wood composite panels. This allows for a use of the composition within the panel rather than as a subsequent coating once the panel has been produced. As a consequence, the production of the panels is more efficient and cost effective.

In a third aspect, the present invention provides for a specific use of the composition in fire retardant wood composite panels according to claim 22, the respective method for producing those panels in claim 23, as well as the resulting panels according to claim 24. The resulting panels comply with various fire test standards (ASTM, EN, DIN, BS, NF P) for construction products.

DETAILED DESCRIPTION OF THE INVENTION

The present invention concerns a fire retardant composition, its use in wood composite panels, the method for production thereof and the resulting wood composite panel.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation. The expression "% by dry weight of the composition" is to be understood as the relative weight of the respective component based on the overall weight of the dry matter of the formulation.

The expression "wood composite panels" refers to a range of derivative wood products which are manufactured by binding or fixing the strands, particles, fibers, or veneers or boards of wood, together with adhesives, resins of bicofibers, to form composite materials. Typically, engineered wood products are made from the same hardwoods and softwoods used to manufacture lumber. Sawmill scraps and other wood waste can be used for engineered wood composed of wood particles or fibers, but whole logs are usually used for veneers, such as plywood, medium density fiberboard (MDF) or particle board. Some engineered wood products, like oriented strand board (OSB), can use trees from the poplar family, a common but non-structural species.

Alternatively, it is also possible to manufacture similar engineered bamboo from bamboo; and similar engineered cellulosic products from other lignin-containing materials such as rye straw, wheat straw, rice straw, hemp stalks, kenaf stalks, or sugar cane residue, in which case they contain no actual wood but rather vegetable fibers.

Hence, wood composite panels may include, but are not limited to plywood, fiberboard, oriented strand board (OSB) laminated timber or veneer, particle board, panel board, or medium density fiberboard (MDF), high density fiberboard (HDF) or wood and cellulose fiber insulation.

The term "dry" as is used herein in connection with a composition of the invention, or with individual components of a composition of the invention, means that water, and other aqueous and non-aqueous liquids, are not an ingredient or component of the composition, but that the dry composition may, or may not, include some moisture. The amount of moisture that may be present in a dry composition of the invention preferably is less than about 1% by weight, more preferably less than 0.5% by weight, and more preferably is less than about 0.1% by weight, and most preferably is about 0% by weight. A dry composition of the invention may, for example, be in the form of a powder, granules, particles, pellets and/or the like. The various forms that dry compositions may take are known by those having ordinary skill in the art.

The phrase "aqueous" as is used herein in connection with a composition of the invention means that the composition has been at least partially dissolved in a solvent such as water, or that a dispersion has been produced.

The term "composition" as is used herein means a product that results from the combining of more than one ingredient.

The term "fire retardant agent" as used herein is to be understood as an agent which when added to a wood composite material, is able to provide fire retardancy characteristics to said material. Fire retardancy is defined by the reduction of release of energy, spread of flame and speed at which the flame spreads during a fire.

The term "smoke suppressing agent" is to be understood as an agent which, when added to a wood composite material, is able to reduce the smoke production or density of the material when heated or burning.

The term "intumescent formulation" is to be understood as a formulation which, when added to a wood composite material, swells as a result of heat exposure, thus increasing in volume. And thereby protecting the wood composite material and/or preventing further spreading of the fire. Intumescents are typically used in passive fire protection.

In a first aspect, the invention provides a fire retardant composition for use in wood composite panels, said composition comprising at least one fire retardant agent, a pH regulating compound and optionally a smoke suppressing agent, whereby the pH of a 10% aqueous solution of said composition lies between 3.5 and 8.5, more preferably between 4.0 and 8.0.

The inventors of the current invention found that by regulating the pH of the composition to a narrow and predefined range by use of a pH regulating compound, an optimal compatibility with the resins used during the production of the wood composite panels is obtained. The pH of the composition is determined in a 10% aqueous solution of the composition, which allows standardization amongst all compositions complying with the scope of the current invention. The pH can be measured by any suitable method know in the art. By preference the pH is measured by potentiometry.

Said fire retardant agent is preferably chosen from the group of ammonium (poly)phosphates such as monoammonium dihydrogen phosphate (MAP), di-ammonium hydrogen phosphate (DAP, both technical and fertilizer grade) or ammonium polyphosphate (of various chain lengths), melamine phosphate, melamine polyphosphate; ammonium sulfate; ammonium chloride; ammonium sulfamate; guanidine phosphate; guanidine hydrogen phosphate; guanidine sulfamate; guanidine carbonate; methylene urea, urea phosphate and alkaline earth phosphates or any mixture thereof.

By preference, the total concentration of the fire retardant agent in the composition is between 25 and 100% by dry weight of said composition, more preferably between 25 and 98% by dry weight of said composition. Below this ratio, the composition will not provide sufficient fire retardant protection when added to wood composite products.

In one embodiment, said 10% aqueous solution of said fire retardant composition has a pH which lies between 5.0 and 7.0 when the resin is chosen from the group of urea-formaldehydes, said resin being preferably melamine urea-formaldehyde. In another embodiment, said resin is chosen from the group of phenol-formaldehyde, in which case the 10% aqueous solution has a pH between 6.0 and 8.0. In another embodiment, the resin is chosen from the group of isocyanates, in which case the 10% aqueous solution of said fire retardant composition has a pH between 4.0 and 6.0. These pH values are obtained by use of a pH regulating compound and are specifically chosen to minimalize the influence of the fire retardant composition on the functionality of the chosen resin.

In one embodiment, said one or more fire retardant agents in the composition act uniquely as fire retardant. In another embodiment, said fire retardant agents may have a dual function, and may for instance also act as a pH regulating compound. This is specifically the case when a high concentration of pH regulating compound is needed in order to comply with the desired pH range of the current invention. Typically, when the concentration of the pH regulating compound exceeds a total concentration of 10% by dry weight of the composition, care is taken to choose a pH regulating compound which may simultaneously provide fire retarding and/or smoke suppressing activity within the composition, in order to prevent a lesser active composition. Examples of pH regulating compounds with dual action are for instance monoammonium or diammonium phosphate. When the latter are used to regulate the pH, a second fire retardant agent will always be present in the composition.

By preference, said pH regulating compound may be chosen from the group of mono-ammonium dihydrogen or di-ammonium hydrogen phosphate (both technical and fertilizer grade), guanidine phosphate, guanidine hydrogen phosphate, guanidine carbonate, ammonium or aluminum sulfate, magnesium phosphate, magnesium ammonium phosphate, monoethanolamine, phosphoric acid, sulfamic acid, mono or di calcium phosphate, mono-, di-, trialkali metal phosphates, ammonia or ammonia solution, melamine, or any mixture thereof.

The amount of the pH regulating compound which needs to be added to the composition is thus determined, that the pH of the final composition, when in a 10% aqueous solution lies between 3.5 and 8.5, more preferably between 4.0 and 8.0.

By preference, the total concentration of said pH regulating compounds is between 2 and 60% by dry weight of the composition. As mentioned, when the total concentration of the pH regulating compound exceeds 10%, it will be opted to use a pH regulating compound which has a dual function, either as a fire retardant agent or smoke suppressing agent or both, in order to ensure the activity of the composition in terms of fire retardant (and smoke suppressing) activity.

The composition of the current invention may optionally comprise a smoke suppressing agent, which preferably is present in a total concentration of between 0 and 40% by dry weight of said composition; more preferably between 0 and 25% by dry weight of said composition, even more preferably in a concentration of between 1 and 20% by dry weight of said composition.

Said smoke suppressing agent, when present, is chosen from the group of borate minerals, boric acid or a salt thereof such as zinc borate, borax (decahydrate or pentahydrate), disodium octaborate (anhydrous or tetrahydrate); calcium or magnesium phosphates (e.g. monocalcium phosphate, dicalcium phosphate), magnesium ammonium phosphate (anhydrous or hydrate) and magnesium hydroxide or a mineral thereof such as brucite; or any mixture thereof.

By preference, borate minerals are ulexite, colemanite, kernite, howlite or probertite. The inventors of the current invention found that these minerals have good smoke suppressing function. Because of their natural nature, they exhibit no or only very low toxicity which makes them particularly useful for use in the fire retardant compositions according to the current invention. As a consequence, these minerals are good alternatives for e.g. more toxic smoke suppressors such as boric acid or disodium octaborate (DOT) or can be used to reduce the amount of these components when present in the fire retardant compositions according to the current invention.

In a second aspect, the invention provides a fire retardant composition for use in wood composite panels, whereby said composition comprises an intumescent formulation as fire retardant agent, wherein the pH of a 10% aqueous solution of said composition lies between 3.5 and 8.5, more preferably between 4.0 and 8.0.

While intumescent formulations are used for protection of structural steel and after treatment of natural wood or wood panels, whereby these formulations are applied as a coating, mass incorporation of intumescent formulations in the surface and the core of wood and cellulose based materials has shown to be a difficult process. Intumescent formulations often show incompatibility with resins used in such wood panels leading to dysfunctional panels. The inventors of the current invention now found that by regulating the pH of the composition to a narrow and predefined range by use of a pH regulating compounds, an optimal compatibility with the resin used during the production of wood composite panels can be obtained. The pH of the composition is determined in a 10% aqueous solution of the composition, which allows standardization amongst all compositions complying with the scope of the current invention.

The total concentration of said fire retardant agent in the fire retardant composition is preferably between 25 and 100% by dry weight of said composition, more preferably between 25 and 98% by dry weight of said composition. Below this ratio, the composition will not provide sufficient fire retardant protection and intumescent capabilities when added to wood composite products.

By preference, said intumescent formulation comprises a mixture of one or more acid components, one or more spumific agents, a pH regulating compound and optionally one or more carbonific components, a binding component and/or an ablative acting fire retarding component. Said formulation undergoes thermal degradation upon heating, producing a thermally stable, foamed and multicellular residue called intumescent char. The acid source is preferably an inorganic acid and can be either readily available or formed from a precursor upon heating. The carbonific components are preferably polyhydric compounds rich in carbon atoms. Said spumific agent produces non-flammable gases which participate in the formation of an expanded intumescent char.

Preferably the concentration of the acid components is between 10.0 and 95.0% by dry weight of said formulation, more preferably between 30.0 and 75.0% by dry weight of said formulation, even more preferably between 50.0 and 70.0% by dry weight of said formulation. The concentration of the carbonific components when present is preferably between 0.05 and 60.0% by dry weight of said formulation, more preferably between 1% and 60.0% by dry weight, more preferably between 10.0 and 50.0% by dry weight of said formulation, even more preferably between 10.0 and 30.0% by dry weight of said formulation. The concentration of the spumific agents is preferably between 0.2 and 80.0% by dry weight of said formulation, more preferably between 0.1 and 50.0% by dry weight of said formulation, even more preferably between 0.1 and 30.0% by dry weight of said formulation. The concentration of the binding component, if present, is preferably between 0.2 and 40.0% by dry weight of said formulation, more preferably between 0.5 and 20.0% by dry weight of said formulation and the concentration of the ablative acting fire retarding component, if present, is preferably between 0.2 and 20.0% by dry weight of said formulation, more preferably between 0.5 and 10.0% by dry weight of said formulation. Outside these ranges, the composition will not provide sufficient fire retardant protection when added to wood composite products. Moreover, the intumescent activity of the formulation will be suboptimal outside these ranges.

In a preferred embodiment, the intumescent formulation used in the framework of the current invention will comprise of:
- between 10.0 to 95.0% of acid components by dry weight of the formulation,
- between 0.05% to 60.0% of carbonific components by dry weight of the formulation,
- between 0.2 to 80.0% of spumific components by dry weight of the formulation,
- optionally between 0.2 and 40.0% of binding component by dry weight of the formulation, and
- optionally between 0.2 and 20.0% of ablative acting fire retarding component by dry weight of the formulation.

In one embodiment, said acid components are chosen from the group of phosphoric acid, sulfuric acid, boric acid, monoammonium dihydrogen phosphate, diammonium hydrogen phosphate, ammonium polyphosphate, ammonium sulfate, ammonium halides, urea phosphate, guanyl urea phosphate, guanidine carbonate, melamine phosphate, melamine polyphosphate, melamine cyanurate, pentaerythritol phosphate, guanidine phosphate and other amine and amide phosphates.

In a further or other embodiment, said carbonific components are chosen from the group of glucose, arabinose and other monosaccharides, lactose, maltose and other disaccharides, starch, cellulose, dextrin and other polysaccharides, sorbitol, erythritol, pentaerythritol, dipentaerythritol, tripentaerythritol, other polyhydric alcohols and other substances susceptible to dehydration or deamination.

In a further or other embodiment, said spumific agents are chosen from the group of melamine, melamine cyanurate, melamine phosphate, melamine polyphosphate and other melamine-based compounds, guanidine phosphate, guanidine sulfate, guanidine carbonate and other guanidine salts.

As a binder in said formulation, a polymer dispersion of acrylate, styrene-acrylate, vinyl acetate, vinyl acetate-ethylene, polyvinylethers and polyurethanes is possible. Also ablative acting fire retardant agents such as aluminum hydroxide, aluminum oxide hydroxide, magnesium hydroxide, colemanite or ulexite can be involved in said formulation. The efficiency of the intumescent formulation can be increased by synergistic effects taking place between the different components. Other additives, like titanium dioxide, can modify the intumescent char structure, yielding a better fire retardancy.

By preference, said 10% aqueous solution of said fire retardant composition has a pH which lies between 5.0 and 7.0 when the resin is chosen from the group of urea-formaldehydes, said resin being preferably melamine urea-formaldehyde. In another embodiment, said resin is chosen from the group of phenol-formaldehyde, in which case the 10% aqueous solution has a pH between 6.0 and 8.0. In another embodiment, the resin is chosen from the group of isocyanates, in which case the 10% aqueous solution of said fire retardant composition has a pH between 4.0 and 6.0. These pH values are obtained by use of a pH regulating compound and are specifically chosen to minimize the influence of the fire retardant composition on the functionality of the chosen resin.

In one embodiment, said one or more acid components, carbonific components and spumific components only perform a single function. In another embodiment, said components may have a dual function, and may for instance also act as a pH regulating compound. This is specifically the case when a high concentration of pH regulating compound is needed in order to comply with the desired pH range of the current invention. Typically, when the concentration of the pH regulating compound exceeds a total concentration of 10% by dry weight of the composition, care is taken to choose a pH regulating compound which may simultaneously act as an acid component, a carbonific component or a spumific component, in order to prevent a lesser active composition. Examples of pH regulating compounds with dual action are for instance monoammonium or diammonium phosphate.

By preference, said pH regulating compound may be chosen from the group of mono-ammonium dihydrogen or di-ammonium hydrogen phosphate (both technical and fertilizer grade), guanidine phosphate, guanidine hydrogen phosphate, ammonium or aluminum sulfate, magnesium phosphate, magnesium ammonium phosphate (anhydrous or hydrate), monoethanolamine, phosphoric acid, sulfamic acid, mono or di calcium phosphate, mono-, di-, trialkali metal phosphates, ammonia or ammonia solution, melamine or any mixture thereof.

The amount of the pH regulating compound which needs to be added to the composition is thus determined, that the pH of the final composition, when in a 10% aqueous solution lies between 3.5 and 8.5, more preferably between 4.0 and 8.0.

By preference, the total concentration of said pH regulating compounds is between 2 and 60% by dry weight of the composition. As mentioned, when the total concentration of the pH regulating compound exceeds 10%, it will be opted to use a pH regulating compound which has a dual function in the intumescent formulation.

The compositions as described above, are a particulate dry matter, such as a powder, ground, pulverized or otherwise finely dispersed solid particles, whether not compressed (i.e. in loose form) or compressed together to produce a solid structure, such as a solid structure in the shape of a pill, powder, pellet, stick or the like.

By preference, for powders, at least 90% of the particles present in the compositions will have a particle size which is smaller than 200 μm. In another or further embodiment, at least 90% of the particles present in the compositions when in a dry formulation will have a particle size of less than 60 μm. More preferably, at least 70 of the particles will have a particle size of less than 40 μm.

Methods to determine the particle size are known in the art. A particularly suitable method is laser diffraction.

The compositions may equally be in a liquid form, such as a dispersion or suspension, a solution, an emulsion or a slurry. By preference, water is used as solvent.

Such liquid can be obtained by use of a particulate dry matter composition according to the current invention and thereby producing an aqueous solution, dispersion or slurry. This could for instance be done on the site of the wood composite panel production, just prior to adding the composition to the production line. Another possibility is the ready-to-use production of a dispersion according to an embodiment of the current invention, by means of one or more tanks provided with a mixing device suitable for making a dispersion. The constituents of the compositions according to the current invention are added to a mixing tank with the addition of water, after which an aqueous solution or dispersion is made.

When used as a dispersion, the compositions according to the current invention may be further comprising a thickener and/or viscosity regulator and/or a wetting agent. Said thickener may be an organic or an inorganic thickener to adjust the viscosity of the dispersion to a predefined viscosity target. Suitable organic include cellulosic material and gums such as xanthan gum. If very fine dispersions are achieved, inorganic thickeners such as, but not limiting to, clay thickeners such as bentonite or sepiolite thickeners are suited for the current invention. Addition of these compounds prevents settlement of particles in dispersions according to the current invention, hence aiding to prolong the shelf life of the compositions.

The compositions according to the current invention may further comprise a detection compound and/or an antimicrobial or antifungal compound.

Said detection compound can be understood as a tracer, in an amount that is sufficient to permit a determination by one or more detection processes before or after a material has been exposed to flame or fire (or other burning), of whether or not a composition of the invention had been applied to the material prior to the material being exposed to the flame or fire (or other burning), and if so, whether the composition had been applied to the material properly.

An antimicrobial and/or antifungal compound can be understood as any substance which may inhibit growth of microorganisms such as bacteria or fungi in the wood composite panels when treated with the compositing according to the current invention.

In a third aspect, the invention provides a use of said fire retardant composition according to one of the embodiments as described above in wood composite panels, whereby said fire retardant composition and its pH is specifically chosen in function of the resin that is used in the wood composite panel. When used as a dispersion, the compositions can be used as they are. In case the compositions comprise a powder, they are preferably diluted in water according to a ratio between 40/60 and 70/30, preferably between 50/50 and 60/40. The compositions are mixed with or sprayed upon cellulose containing material, preferably prior to said cellulose containing material begin pressed to a panel in the presence of a resin.

The invention also provides a method for the production of wood composite panels comprising a fire retardant composition according to one of the embodiments as described above and a resin, whereby said resin is chosen from the group of melamine-urea-formaldehydes, phenol-formaldehydes or isocyanates and whereby said fire retardant composition either comprises at least one fire retardant agent or an intumescent formulation, whereby the pH of a 10% aqueous solution of said composition lies between 3.5 and 8.5, more preferably between 4.0 and 8.0.

Said method for the production of said composite panel boards comprises the following steps: the shredding of wood into wood strips and/or the chipping of wood into smaller wood chips, the addition of said fire retardant composition and said resin to said wood strips or chips, preferably by spraying the fire retardant composition and resin on the wood strips or chips, the orientation of said wood strips or chips on a belt or a wire caul into a mat, the subsequent heat compression of this mat, resulting in a compressed panel, finally cutting this compressed panel to the desired panel size.

In one embodiment, the production of wood composite panel boards comprises the use of melamine urea-formaldehyde (MUF) or urea-formaldehyde (UF) as a resin, in this case the pH of a 10% aqueous solution of the composition according to one of aforementioned embodiments is preferably between 5.0 and 7.0. In another embodiment, preferably when an intumescent formulation is used as fire retardant, the resin is chosen from the group of phenol-formaldehyde, in which case the 10 aqueous solution of said fire retardant composition has a pH between 6.0 and 8.0. In another embodiment, the production of wood composite panel boards comprises the use of a polymeric isocyanate or isocyanate-prepolymer as a resin. In this case the pH of a 10% aqueous solution of the composition according to one of aforementioned embodiments is preferably between 4.0 and 6.0, such e.g. 4.6 or 5.0.

The invention also provides a wood composite panel, comprising a fire retardant composition and a resin, whereby said fire retardant composition comprises at least one fire retardant agent, a pH regulating compound and optionally a smoke suppressing agent, whereby the pH of a 10% aqueous solution of said composition lies between 3.5 and 8.5, more preferably between 4.0 and 8.0, depending on the chosen resin. By preference, said panels produced by addition of a composition according to the current invention are medium-density fiberboard (MDF), HDF, oriented strand board (OSB), particle board or wood and cellulose fiber insulation products. As a consequence, the current invention equally relates to such panels provided with the fire retardant composition as described herein.

EXAMPLES

The invention is further explained, by examples which are not to be seen as limitative for the scope of the current invention.

Flame Retardant Composition Specifically Suitable for Use in Particle Boards
MAP (monoammonium dihydrogen phosphate) 83%
DAP (diammonium hydrogen phosphate) 2.0%
Ammonium sulfate 5.0%
MCP (monocalcium phosphate) 5%
DCP (dicalcium phosphate) 2.5%
Ulexite (natrium calcium borate) 2.5%
pH of a 10% solution of the composition is 4.5.

Flame Retardant Composition Specifically Suitable for Use in MDF
MAP (monoammonium dihydrogen phosphate) 42.5%
DAP (diammonium hydrogen phosphate) 30.0%
Guanidine phosphate 12.5%
MGP (magnesium hydrogen phosphate) 10%
Colemanite (calcium borate) 5%
pH of a 10% solution of the composition is 6.2.

Intumescent Flame Retardant Composition Specifically Suitable for Use in OSB
ammonium polyphosphate 75.0%
ammonium dihydrogen phosphate 5.0%
melamine 8.0%
melamine phosphate 2%
vinyl acetate/acrylate dispersion 10%
pH of a 10% solution of the composition is 5.0.

Intumescent Flame Retardant Composition Specifically Suitable for Wood Fibre Insulation
monoammonium dihydrogen phosphate 75%
melamine 15%
pentaerythritol 5.0%
titanium dioxide 5.0%
pH of a 10% solution of the composition is 4.5

Intumescent Flame Retardant Composition Specifically Suitable for Use in Plywood
guanidine phosphate 78.0% phosphoric acid 12.5%
Di-sodium Octaborate tetrahydrate 9.5%
pH of a 10% solution of the composition is 6.0.

The invention claimed is:

1. A method for flame retarding a wood composite panel comprising:
applying a composition to the wood composite panel, wherein the composition comprises at least one fire retardant agent chosen from monoammonium dihydrogen phosphate (MAP); di-ammonium hydrogen phosphate (DAP); ammonium polyphosphate; melamine phosphate; melamine polyphosphate; guanidine phosphate; guanidine hydrogen phosphate; and any combinations thereof, whereby a total concentration of said fire retardant agent in the composition is 25 to 98% by dry weight of the composition; at least one smoke suppressing agent, whereby a total concentration of smoke suppressing agents is 1-20% by dry weight of said composition; and a pH regulating compound, wherein the wood composite panel comprises a resin, and the pH of a 10% aqueous solution of the composition is 4.2-5.2 and the resin is methylene diphenyl diisocyanate (MDI).

2. The method according to claim 1, wherein the composition further comprises a mixture of one or more acid components, one or more spumific agents, and optionally one or more carbonific components, a binding component and/or an ablative acting fire retarding component.

3. The method according to claim 2, characterized in that said acid components are chosen from phosphoric acid, sulfuric acid, boric acid, monoammonium dihydrogen phosphate, diammonium hydrogen phosphate, ammonium polyphosphate, ammonium sulfate, ammonium halides, urea phosphate, guanyl urea phosphate, guanidine carbonate, melamine phosphate, melamine polyphosphate, melamine cyanurate, pentaerythritol phosphate, guanidine phosphate, other amine phosphates, and other amide phosphates.

4. The method according to claim 2, characterized in that said composition comprises one or more carbonific components which are chosen from glucose, arabinose and other monosaccharides, lactose, maltose and other disaccharides, starch, cellulose, dextrin, other polysaccharides, sorbitol, erythritol, pentaerythritol dipentaerythritol, tripentaerythritol, other polyhydric alcohols, and other substances susceptible to dehydration or deamination.

5. The method according to claim 2, characterized in that said spumific agents are chosen from melamine, melamine cyanurate, melamine phosphate, melamine polyphosphate, other melamine-based compounds, guanidine phosphate, guanidine sulfate, guanidine carbonate, and other guanidine salts.

6. The method according to claim 1, wherein the composition further comprises a binding component, wherein the binding component is chosen from acrylate, styrene-acrylate, vinyl acetate, vinyl acetate-ethylene, polyvinylethers and polyurethanes.

7. The method according to claim 1, wherein the composition further comprises an ablative acting fire retarding component, wherein the ablative acting fire retarding component is chosen from aluminum hydroxide, aluminum oxide hydroxide, magnesium hydroxide, titanium dioxide, colemanite, ulexite and other ablative acting substances.

8. The method according to claim 1, wherein said smoke suppressing agent is chosen from borate minerals, boric acid or a salt thereof, calcium or magnesium phosphates and magnesium hydroxide or a mineral thereof.

9. The method according to claim 8, characterized in that said borate minerals are ulexite, colemanite, kernite, howlite or probertite.

10. The method according to claim 1, characterized in that said pH regulating compound is chosen from monoammonium dihydrogen, diammonium hydrogen phosphate, guanidine phosphate, guanidine hydrogen phosphate, guanidine carbonate, ammonium or aluminum sulfate, magnesium phosphate, magnesium ammonium phosphate, monoethanolamine, phosphoric acid, sulfamic acid, magnesium phosphate, mono- or dicalcium phosphate, mono-, di-, trialkali metal phosphates, ammonia or ammonia solution, melamine, and combinations thereof.

11. The method according to claim 10, characterized in that said pH regulating compound is chosen from ammonium (poly)phosphates and ammonium sulfate.

12. The method according to claim 1, characterized in that the total concentration of said pH regulating compound is between 2 and 60% by dry weight of the composition.

13. The method according to claim 1, characterized in that said composition is in a powder or liquid form.

14. The method according to claim 1, wherein the composition further comprises a thickener and/or viscosity regulator.

15. The method according to claim 1, whereby said composition comprises a detection compound and/or an antimicrobial or antifungal compound.

16. The method according to claim 1, wherein the applying comprises mixing or spraying a cellulose containing material on a portion of a surface of the wood panel prior to the cellulose containing material being pressed to the wood panel in the presence of the resin.

17. The method according to claim 1, characterized in that said fire retardant composition is applied to cellulose based strips, chips or particles by spraying or mixing.

18. A wood composite panel made by a method according to claim 1.

19. The wood composite panel according to claim 18, characterized in that said wood composite panel is a medium-density fiberboard (MDF), high density fiberboard (HDF), oriented strand board (OSB), particle or panel board.

* * * * *